US008335621B2

(12) United States Patent
Ayabe et al.

(10) Patent No.: US 8,335,621 B2

(45) Date of Patent: Dec. 18, 2012

(54) VEHICLE CONTROL APPARATUS

(75) Inventors: Atsushi Ayabe, Toyota (JP); Tomohiro Asami, Nissin (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 229 days.

(21) Appl. No.: 12/624,700

(22) Filed: Nov. 24, 2009

(65) Prior Publication Data

US 2010/0131160 A1 May 27, 2010

(30) Foreign Application Priority Data

Nov. 25, 2008 (JP) ................................ 2008-299329

(51) Int. Cl.
*G06F 7/00* (2006.01)

(52) U.S. Cl. ........................................................ 701/54

(58) Field of Classification Search ........................ None
See application file for complete search history.

(56) References Cited

U.S. PATENT DOCUMENTS 7,347,802 B2 * 3/2008 Tatara et al. ...................... 477/5
7,963,107 B2 * 6/2011 Wirth et al. ..................... 60/295
2003/0034653 A1 * 2/2003 Kitajima et al. ............ 290/40 C
2005/0082913 A1 * 4/2005 Nomura ....................... 307/10.1
2006/0048734 A1 * 3/2006 Kataoka et al. ............ 123/179.4
2007/0084429 A1 * 4/2007 Taki et al. .................. 123/179.4
2008/0168964 A1 * 7/2008 Kimura et al. ................ 123/325

FOREIGN PATENT DOCUMENTS

JP 60113224 A 7/1985
JP 60113224 U 7/1985
JP 01220765 A 9/1989
JP 03182658 A 8/1991
JP 08011591 A 1/1996
JP 2003063279 A 3/2003
JP 2004263646 A 9/2004
JP 2004263733 A 9/2004
JP 2004263875 9/2004
JP 2004346867 A 12/2004
JP 2005098522 A 4/2005
JP 2007002803 A 1/2007
JP 2008045446 A 2/2008

* cited by examiner

*Primary Examiner* — Thomas Tarcza
*Assistant Examiner* — Nagi Murshed
(74) *Attorney, Agent, or Firm* — Gifford, Krass, Sprinkle, Anderson & Citkowski, P.C.

(57) ABSTRACT

When downshift control is performed during fuel cut control (when coast-down gearshift control is performed), fuel cut reset revolutions are lowered and set to revolutions Ndwn that are lower than fuel cut reset revolutions Nnor for normal control. By such a setting, it becomes possible to maintain fuel cut control and deceleration lockup slippage control even when engine revolutions NE temporarily drop during execution of coast-down gearshift control, so an improvement in fuel consumption can be achieved. Moreover, it becomes unnecessary to set a downshift gearshift line to a higher vehicle speed side, so fuel cut can be maintained while suppressing the occurrence of a gearshift shock.

6 Claims, 13 Drawing Sheets

| | C1 | C2 | C3 | C4 | B1 | B2 | B3 | B4 | F0 | F1 | F2 | F3 |
|---|---|---|---|---|---|---|---|---|---|---|---|---|
| P | | | | | | | | | | | | |
| R | | | ○ | | ◎ | | | ○ | | ○ | | |
| N | | | | | | | | | | | | |
| 1st | ○ | | | ◎ | | | | ◎ | ○ | | | ○ |
| 2nd | ○ | | | ◎ | | ◎ | ○ | | ○ | ○ | ○ | |
| 3rd | ○ | | ○ | ◎ | ◎ | | △ | | ○ | ○ | | |
| 4th | ○ | ○ | △ | ◎ | | | △ | | ○ | | | |
| 5th | △ | ○ | ○ | | ○ | | △ | | | | | |
| 6th | △ | ○ | | | △ | ○ | △ | | | | | |

○ engagement
◎ engagement during engine braking
△ engagement unrelated to power transmission

VEHICLE CONTROL APPARATUS

CROSS REFERENCE TO RELATED APPLICATION

This application claims priority under 35 U.S.C. §119(a) on Patent Application No. 2008-299329 filed in Japan on Nov. 25, 2008, the entire contents of which are herein incorporated by reference.

BACKGROUND OF THE INVENTION

The present invention relates to a vehicle control apparatus equipped with an engine (internal combustion engine) and an automatic transmission.

In a vehicle equipped with an engine, as a transmission that appropriately transmits torque and revolutions generated by the engine to drive wheels according to the running state of the vehicle, an automatic transmission is known that automatically optimally sets a gear ratio between the engine and the drive wheels.

Examples of an automatic transmission mounted in a vehicle include a planetary gear transmission that sets a gear using frictionally engaging elements such as a clutch and a brake and a planetary gear apparatus, and a belt-driven stepless transmission (CVT: Continuously Variable Transmission) that steplessly adjusts the gear ratio.

In a vehicle in which a planetary gear-type automatic transmission is mounted, a gearshift map that has gearshift lines (gear switching lines) for obtaining an optimal gear according to the vehicle speed and an accelerator opening degree (or throttle opening degree) is stored in an ECU (Electronic Control Unit) or the like, a target gear is calculated with reference to the gearshift map based on the vehicle speed and the accelerator opening degree, and based on that target gear, a gear (gear ratio) is automatically set by engaging or releasing a clutch, a brake, a one-way clutch, and the like, which are frictionally engaging elements, in a predetermined state.

In the configuration of a belt-driven stepless transmission, a belt is wrapped around a primary pulley (input side pulley) and a secondary pulley (output side pulley) that are provided with a pulley groove (V groove), and by reducing the groove width of one pulley while increasing the groove width of the other pulley, the contact radius (effective diameter) of the belt to each of the pulleys is continuously changed to steplessly set a gear ratio.

In a vehicle equipped with such an automatic transmission, a torque converter is disposed in a power transmission path from the engine to the automatic transmission. The torque converter, for example, is provided with a pump impeller connected to an engine output shaft (crank shaft), a turbine runner connected to an input shaft of the automatic transmission, and a stator provided between the pump impeller and the turbine runner via a one-way clutch. The torque converter is a hydraulic transmission apparatus in which the pump impeller rotates according to rotation of the engine output shaft, and the turbine runner is rotationally driven by operating oil discharged from the pump impeller, thus transmitting engine output torque to the input shaft of the automatic transmission.

The torque converter is provided with a lockup clutch that directly connects an input side (pump side) and an output side (turbine side), and lock-up engagement control is executed to bring the lockup clutch into an engaged state so as to directly connect the input side and the output side of the torque converter. Lock-up slippage control (hereinafter also referred to simply as “slippage control”) is also executed to bring the lockup clutch into a half-engaged state that is intermediate between an engaged state and a released state (see, for example, JP 2004-263875A and JP 2004-263733A).

Lock-up slippage control (flex lock-up control) is started when a predetermined slippage control execution condition (e.g., a condition determined by vehicle speed and accelerator opening degree) has been established. And, the engaging force of the lockup clutch is feedback-controlled according to the difference between the pump revolutions (corresponding to engine revolutions) and the turbine revolutions of the torque converter, for example, such that the difference in revolutions becomes constant, whereby the power transmission state of the torque converter is managed.

Also, in a vehicle equipped with an automatic transmission, fuel cut control is performed. The fuel cut control is to stop fuel supply to the engine in order to improve the fuel consumption ratio (hereinafter referred to as the fuel consumption). Fuel injection into the engine is stopped during deceleration of the vehicle (during coasting) and when the engine revolutions are not less than fuel cut start revolutions, and fuel injection into the engine is resumed when the engine revolutions decrease below the fuel cut reset revolutions (the revolutions at which fuel cut is stopped to restart fuel injection). With the fuel cut reset revolutions, stall resistance (resistance against engine stalling) can be secured, and the fuel cut reset revolutions are set to the revolutions at which it is possible to maintain stable rotation of the engine.

In such fuel cut control, the lockup clutch is slippage-controlled (deceleration lockup slippage control) during execution of fuel cut during deceleration of the vehicle, whereby the rate of decrease in engine revolutions is slowed down to extend the time it takes for the engine revolutions to decrease to the fuel cut reset revolutions. Also, in order to maintain fuel cut control, downshift control (coast-down gearshift control) of the automatic transmission is performed.

A technique for fuel cut control and coast-down control is described in JP 2007-002803A. According to the technique described in JP 2007-002803A, when downshifting is performed during coasting, a determination is made of whether the vehicle state is in a fuel cut prohibited state or a fuel cut permitted state. When the vehicle state is determined to be in the fuel cut prohibited state, fuel supply into the internal combustion engine is temporarily resumed, and by causing the amount of torque increase to be smaller than that when in the fuel cut permitted state, the occurrence of a shock is prevented.

Incidentally, in the above-mentioned coast-down gearshift control for maintaining fuel cut control, there may be instances in which variations in the operating state of the vehicle (variations in oil pressure control or the like), variations in the hardware of the vehicle, or the like cause the engine revolutions to fall, as a result of which, fuel cut control is cancelled.

Specifically, although coast-down gearshift increases engine revolutions, the engine revolutions decrease before the engine revolutions start to increase due to variations in the operating state of the vehicle, variations in the hardware of the vehicle, or the like as mentioned above. When the engine revolutions reach the fuel cut reset revolutions, the fuel cut control is cancelled, and fuel injection into the engine is resumed. Then, upon entry into a fuel injection state due to reset of the fuel cut control, because the engine is no longer in a driven state at the point in time when the engine revolutions exceed the turbine revolutions, deceleration lockup slippage control is cancelled. In such a condition, even if the engine revolutions exceed the fuel cut start revolutions after a downshift and the fuel cut control is resumed, the fuel cut state cannot be maintained for a long period of time. This may cause poor fuel consumption.

In order to solve such problems, according to the current technology, gearshift lines (downshift lines) are set to a higher vehicle speed side in consideration of the variations in the operating state of the vehicle, the variations in the hardware of the vehicle, or the like mentioned above, but a gearshift shock may occur if the gearshift lines are set to a higher vehicle speed side.

The present invention has been made in view of such circumstances, and it is an object thereof to provide a vehicle control apparatus wherein it is possible to further extend fuel cut control execution time while suppressing the occurrence of a gearshift shock.

SUMMARY OF THE INVENTION

The present invention relates to a vehicle control apparatus equipped with an engine and an automatic transmission including: a fuel cut control means that stops fuel injection into the engine on condition that the vehicle is decelerating and engine revolutions are not less than fuel cut reset revolutions, and resumes fuel injection into the engine when the engine revolutions have decreased to the fuel cut reset revolutions; and a downshift control means that executes downshifting of the automatic transmission during fuel cut control by the fuel cut control means, wherein the fuel cut reset revolutions are lowered when executing downshift control during the fuel cut control.

In the present invention, it is possible to adopt a configuration in which a lockup clutch that directly connects the engine and the automatic transmission; and a deceleration lockup slippage control means that performs slippage control on the lockup clutch during the fuel cut control are provided, and the fuel cut reset revolutions are changed to a lower side so as to maintain fuel cut control and deceleration lockup slippage control when executing the downshift control during the fuel cut control.

The problem-solving principles of the invention will be described. First, even if engine revolutions temporarily drop due to variations in the operating state of the vehicle, the variations in the hardware of the vehicle, or the like mentioned above when downshift control is performed during execution of fuel cut control, the engine revolutions always increase when a downshift starts (when an inertia phase starts), and the possibility of engine stalling is reduced. Accordingly, even when the fuel cut reset revolutions are set to a lower side than those for normal control, stall resistance can be secured.

Focusing on such points, in the present invention, for downshift control during execution of fuel cut control, the fuel cut reset revolutions are set lower than the fuel cut reset revolutions for normal control. Such a setting enables fuel cut to be maintained, so an improvement in fuel consumption can be achieved. Moreover, because it becomes unnecessary to set gearshift lines (downshift gearshift lines) to a higher vehicle speed side, it becomes possible to maintain fuel cut while suppressing the occurrence of a gearshift shock.

The fuel cut reset revolutions for downshift control (reset revolutions that are set lower than those for normal control) are set to a value adapted according to testing, calculation, and so forth, in consideration of the amount of a temporary drop (see, for example, FIG. 10) in engine revolutions due to variations in the operating state of the vehicle (variations in oil pressure control or the like), variations in the hardware of the vehicle or the like mentioned above, the possibility of engine stalling caused by such a temporary drop in revolutions, and the like.

Next, another specific configuration of the present invention will be described.

In a first specific configuration, when engine revolutions have decreased to the fuel cut reset revolutions when executing the downshift control during the fuel cut control, a gearshift point (downshift gearshift line) for next downshift control during fuel cut control is changed to a higher vehicle speed side. According to this configuration, even when engine revolutions have reached the fuel cut reset revolutions and fuel cut is canceled (fuel injection is resumed), fuel cut control can be maintained in the next downshift control during execution of fuel cut control, so an improvement in fuel consumption can be achieved.

In another specific configuration, when engine revolutions have a margin with respect to the fuel cut reset revolutions when executing the downshift control during the fuel cut control, a gearshift point for next downshift control during fuel cut control is changed to a lower vehicle speed side. In this case, a downshift gearshift point (downshift gearshift line) for the next downshift control during execution of fuel cut control is set to a lower vehicle speed side by calculating the difference (margin: see FIG. 12A) between the current engine revolutions and the fuel cut reset revolutions and taking that margin into consideration, whereby the occurrence of a gearshift shock can be suppressed more effectively.

In another specific configuration, when engine revolutions have decreased to the fuel cut reset revolutions while executing the downshift control during the fuel cut control, a control timing of a release-side oil pressure of a hydraulic type frictionally engaging apparatus of the automatic transmission is delayed when next downshift control during fuel cut control is performed. With such delay control, the amount of undershoot (see FIG. 13) of the engine revolutions during downshift control can be reduced, making it possible to control the engine revolutions so as not to reach the fuel cut reset revolutions. As a result, fuel cut control and deceleration lockup slippage control can be maintained in the next downshift control during execution of fuel cut control, so an improvement in fuel consumption can be achieved.

BRIEF DESCRIPTION OF THE DRAWINGS

FIG. 5A is a perspective view of relevant parts of a shift operation apparatus, and FIG. 5B shows a shift gate of the shift operation apparatus.

FIG. 6 is a block diagram that shows the configuration of a control system of an ECU or the like.

FIGS. 11A and 11B are timing charts that show another example of coast-down gearshift control.

FIGS. 12A and 12B are timing charts that show another example of coast-down gearshift control.

DESCRIPTION OF REFERENCE NUMERALS

Figure 1:
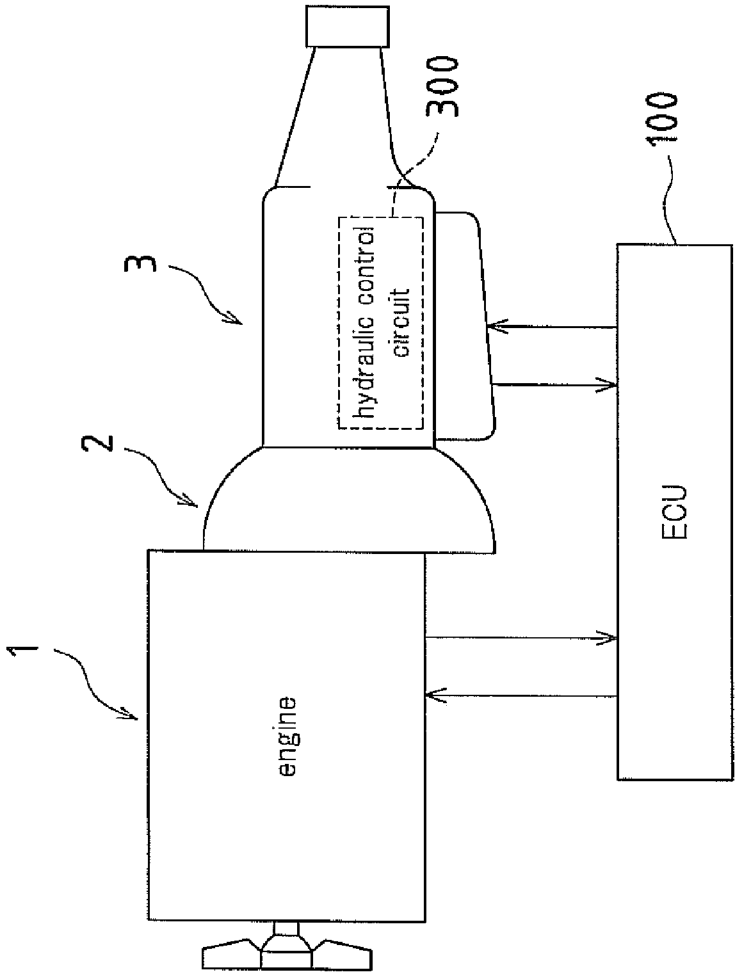
FIG. 1 is a schematic configuration view that shows part of a vehicle in which the present invention is applied.

1 engine
2 torque converter
25 lockup clutch
3 automatic transmission
100 ECU
201 engine revolutions sensor
202 throttle opening degree sensor
203 turbine revolutions sensor
204 output shaft revolutions sensor
205 accelerator opening degree sensor
206 shift position sensor
300 hydraulic control circuit
301 lockup control valve

DESCRIPTION OF EMBODIMENTS

Hereinafter, embodiments of the present invention will be described with reference to the drawings.

FIG. 1 is a schematic configuration view that shows a vehicle in which the present invention is applied.

The vehicle in this example has an FR (front engine/rear drive) configuration, and is provided with an engine 1, an automatic transmission 3 having a torque converter 2, an ECU 100, and so forth, and a vehicle control apparatus of the present invention is realized by a program executed by the ECU 100. Each of the engine 1, the torque converter 2, the automatic transmission 3, and the ECU 100 is described below.

—Engine—

Figure 2:
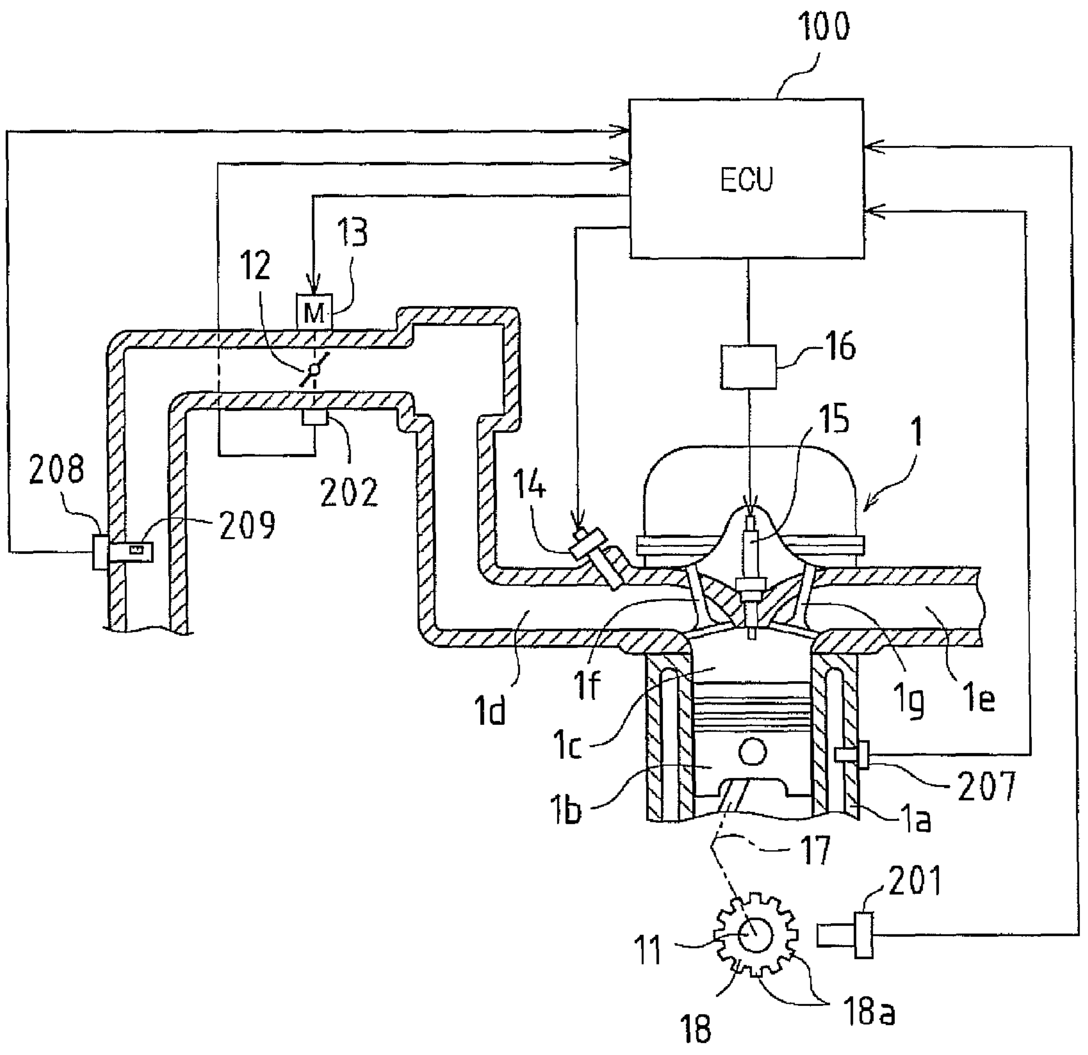
FIG. 2 is a schematic configuration view of an engine applied in the vehicle in FIG. 1.

The engine 1, for example, is a 4-cylinder gasoline engine, and as shown in FIG. 2, is provided with a piston 1*b* that moves back and forth in the vertical direction within a cylinder block 1*a* that constitutes each cylinder. The piston 1*b* is connected to a crank shaft 11 via a connecting rod 17, and back-and-forth movement of the piston 1*b* is converted to rotation of the crank shaft 11 by the connecting rod 17. The crank shaft 11 is connected to an input shaft of the torque converter 2.

Revolutions (engine revolutions NE) of the crank shaft 11 are detected by an engine revolutions sensor 201. The engine revolutions sensor 201, for example, is an electromagnetic pickup, and generates a pulse-like signal (output pulse) that corresponds to protrusions 18*a* of a signal rotor 18 when the crank shaft 11 rotates.

A water temperature sensor 207 that detects an engine water temperature (coolant water temperature) is disposed in the cylinder block 1*a* of the engine 1. An ignition plug 15 is disposed in a combustion chamber 1*c* of the engine 1. Ignition timing of the ignition plug 15 is adjusted by an igniter 16. The igniter 16 is controlled by the ECU 100.

An intake path 1*d* and an exhaust path 1*e* are connected to the combustion chamber 1*c* of the engine 1. An intake valve 1*f* is provided between the intake path 1*d* and the combustion chamber 1*c*, and by driving the intake valve 1*f* open/closed, the intake path 1*d* and the combustion chamber 1*c* are put in communication with or blocked from each other. Also, an exhaust valve 1*g* is provided between the combustion chamber 1*c* and the exhaust path 1*e*, and by driving the exhaust valve 1*g* open/closed, the combustion chamber 1*c* and the exhaust path 1*e* are put in communication with or blocked from each other. Driving to open/close the intake valve 1*f* and the exhaust valve 1*g* is performed by respective rotation of an intake cam shaft and an exhaust cam shaft, to which rotation of the crank shaft 11 is transmitted.

A hot wire airflow meter (intake air amount sensor) 208, an intake temperature sensor 209 (built into the airflow meter 208), and an electronically controlled throttle valve 12 that adjusts the intake air amount of the engine 1 are disposed in the intake path 1*d*. The throttle valve 12 is driven by a throttle motor 13. The throttle valve 12 is capable of electronically controlling a throttle opening degree independent of accelerator pedal operation by the driver, and that opening degree (throttle opening degree) is detected by a throttle opening degree sensor 202. Also, the throttle motor 13 is driven/controlled by the ECU 100.

Specifically, the throttle opening degree of the throttle valve 12 is controlled such that it is possible to obtain an optimal intake air amount (target intake amount) according to the operating state of the engine 1, such as the engine revolutions NE detected by the engine revolutions sensor 201 and the amount the accelerator pedal is depressed (accelerator opening degree) by the driver. More specifically, the actual throttle opening degree of the throttle valve 12 is detected using the throttle opening degree sensor 202, and feedback control of the throttle motor 13 of the throttle valve 12 is performed such that the actual throttle opening degree matches the throttle opening degree at which the above target intake amount can be obtained (target throttle opening degree).

An injector (fuel injection valve) 14 for fuel injection is disposed in the intake path 1*d*. Fuel at a predetermined pressure is supplied from a fuel tank to the injector 14 by a fuel pump, and fuel is injected into the intake path 1*d*. This injected fuel is mixed with intake air to become a mixture and is introduced into the combustion chamber 1*c* of the engine 1. The mixture (fuel+air) that has been introduced into the combustion chamber 1*c* is ignited by the ignition plug 15 and burns/explodes. Due to burning/explosion of this mixture within the combustion chamber 1*c*, the piston 1*b* moves back and forth; thus, the crank shaft 11 rotates. The above operating state of the engine 1 is controlled by the ECU 100.

—Torque Converter—

Figure 3:
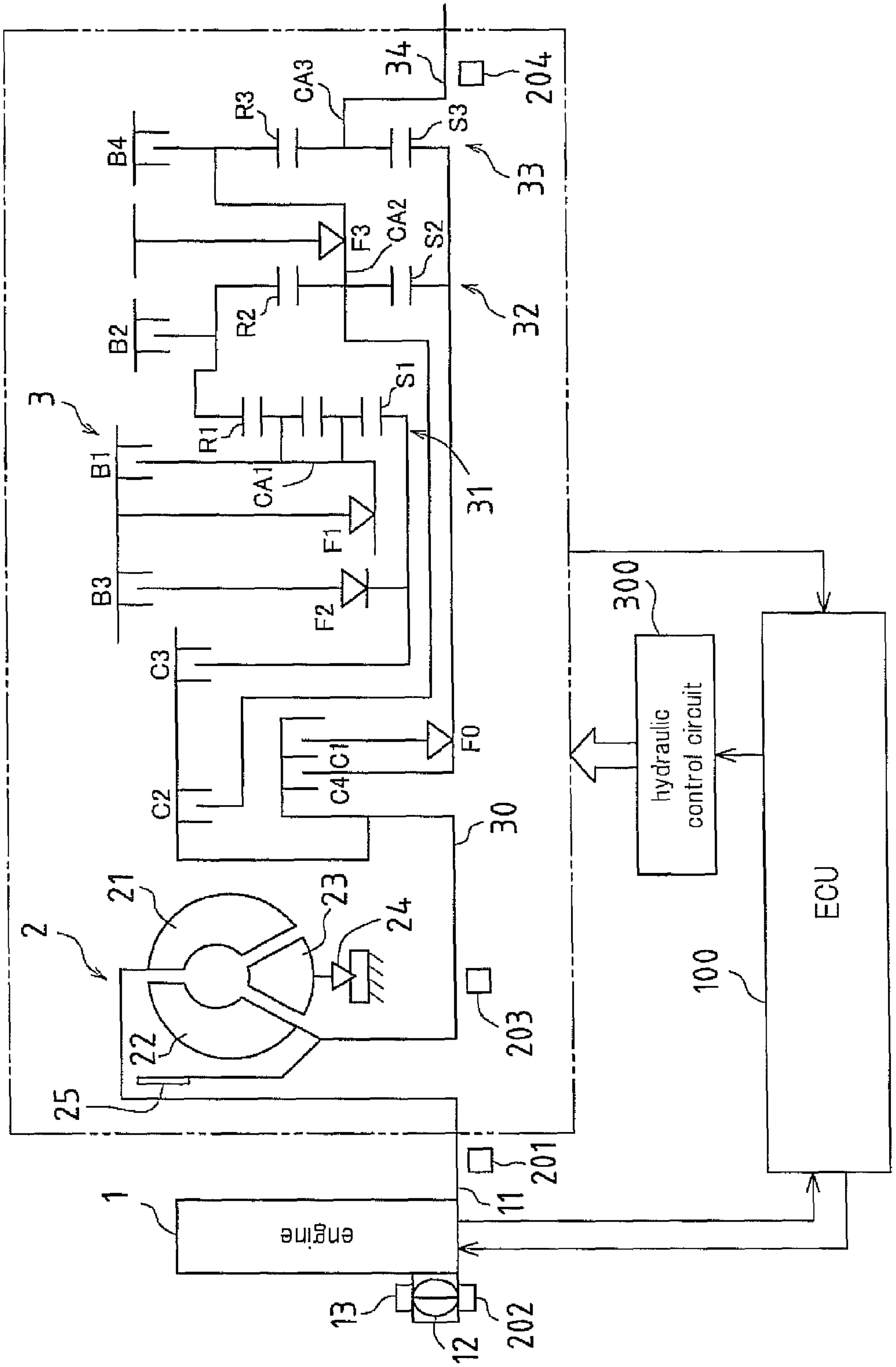
FIG. 3 shows both a schematic configuration view and a control system block diagram of the engine, a torque converter and an automatic transmission that are applied in the vehicle in FIG. 1.

As shown in FIG. 3, the torque converter 2 is provided with an input shaft-side pump impeller 21, an output shaft-side turbine runner 22, a stator 23 that exhibits a torque amplification function, and a one-way clutch 24, and transmits power via a fluid between the pump impeller 21 and the turbine runner 22.

A lockup clutch 25 that establishes a state in which the input side and the output side are directly connected is provided in the torque converter 2, and by completely engaging the lockup clutch 25, the pump impeller 21 and the turbine runner 22 rotate together as a single body. Also, by engaging the lockup clutch 25 in a predetermined slippage state, during driving, the turbine runner 22 rotates following the pump impeller 21 with a predetermined amount of slippage. The torque converter 2 and the automatic transmission 3 are connected by a rotating shaft. Turbine revolutions NT of the torque converter 2 are detected by a turbine revolutions sensor 203. Engagement or release of the lockup clutch 25 of the torque converter 2 is controlled by the hydraulic control circuit 300 and the ECU 100.

—Automatic Transmission—

As shown in FIG. 3, the automatic transmission 3 is a planetary gear transmission provided with a double pinion-type first planetary gear apparatus 31, a single pinion-type second planetary gear apparatus 32, and a single-pinion-type third planetary gear apparatus 33. Power output from an output shaft 34 of the automatic transmission 3 is transmitted to drive wheels via a propeller shaft, a differential gear, a drive shaft, and so forth.

A sun gear S1 of the first planetary gear apparatus 31 of the automatic transmission 3 is selectively connected to an input shaft 30 via a clutch C3. Also, the sun gear S1 is selectively connected to a housing via a one-way clutch F2 and a brake B3; thus, rotation in the reverse direction (opposite direction as rotation of the input shaft 30) is blocked. A carrier CA1 of the first planetary gear apparatus 31 is selectively connected to the housing via a brake B1, and rotation in the reverse direction is always blocked by a one-way clutch F1 provided parallel to the brake B1. A ring gear R1 of the first planetary gear apparatus 31 is connected as a single body to a ring gear R2 of the second planetary gear apparatus 32, and is selectively connected to the housing via a brake B2.

A sun gear S2 of the second planetary gear apparatus 32 is connected as a single body to a sun gear S3 of the third planetary gear apparatus 33, and is selectively connected to the input shaft 30 via a clutch C4. Also, the sun gear S2 is selectively connected to the input shaft 30 via a one-way clutch F0 and a clutch C1; thus, rotation in the reverse direction as rotation of the input shaft 30 is blocked.

A carrier CA2 of the second planetary gear apparatus 32 is connected as a single body to a ring gear R3 of the third planetary gear apparatus 33, and selectively connected to the input shaft 30 via a clutch C2, and also is selectively connected to the housing via a brake B4. Also, rotation of the carrier CA2 in the reverse direction is always blocked by a one-way clutch F3 provided parallel to the brake B4. A carrier CA3 of the third planetary gear apparatus 33 is connected as a single body to the output shaft 34. Rotations of the output shaft 34 are detected by an output shaft revolutions sensor 204.

Figures 4, 5:
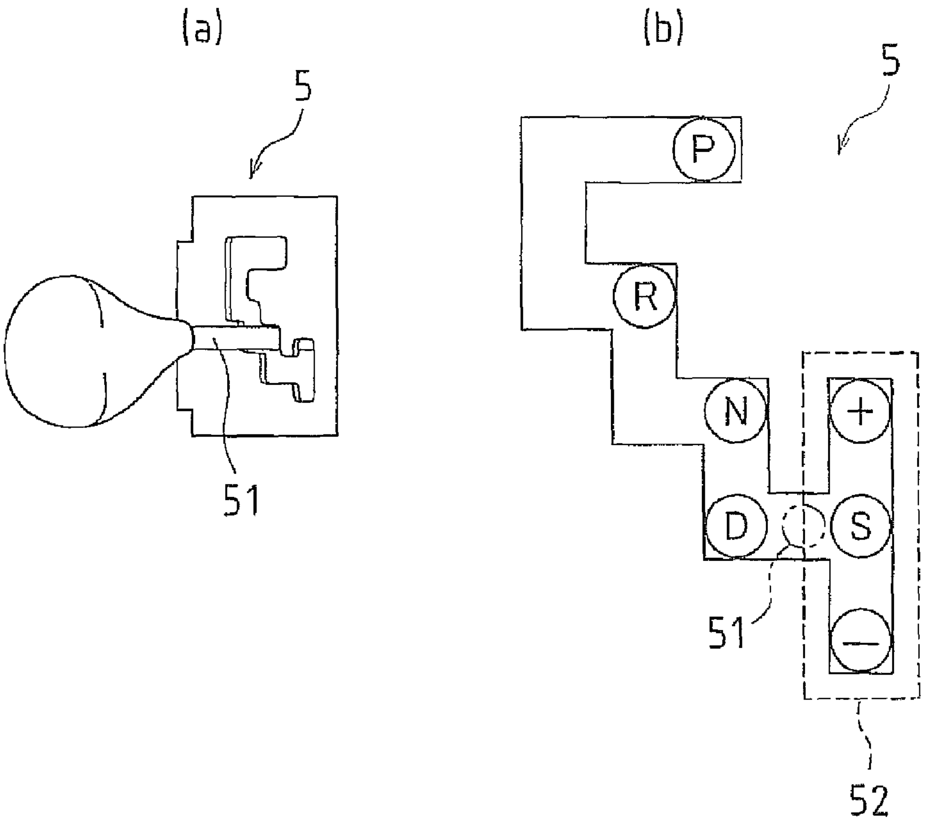
FIG. 4 is an operation table of the automatic transmission shown in FIG. 3.
FIG. 5 includes FIGS. 5A and 5B, where

The engagement/release states of the clutches C1 to C4, brakes B1 to B4, and one-way clutches F0 to F3 of the above automatic transmission 3 are shown in the operation table in FIG. 4. In the operation table in FIG. 4, '○' indicates engagement and a blank space indicates release. Also, '◎' indicates engagement during engine braking, and 'Δ' indicates engagement unrelated to power transmission.

As shown in FIG. 4, in the automatic transmission 3 in this example, in a first (1st) forward gear, the clutch C1 is engaged, and the one-way clutches F0 and F3 operate. In a second forward gear (2nd), the clutch C1 and the third brake B3 are engaged, and the one-way clutches F0, F1, and F2 operate.

In a third forward gear (3rd), the clutches C1 and C3 are engaged, the brake B3 is engaged, and the one-way clutches F0 and F1 operate. In a fourth forward gear (4th), the clutches C1, C2, and C3 are engaged, the brake B3 is engaged, and the one-way clutch F0 operates.

In a fifth forward gear (5th), the clutches C1, C2, and C3 are engaged, and the brakes B1 and B3 are engaged. In a sixth forward gear (6th), the clutches C1 and C2 are engaged, and the brakes B1, B2, and B3 are engaged. In a reverse gear (R), the clutch C3 is engaged, the brake B4 is engaged, and the one-way clutch F1 operates.

In this way, in the automatic transmission 3 in this example, a gear (gear ratio) is set by engaging or releasing the clutches C1 to C4, the brakes B1 to B4, the one-way clutches F0 to F3, and the like, which are frictionally engaging elements, in a predetermined state. Engagement/release of the clutches C1 to C4 and the brakes B1 to B4 is controlled by the hydraulic control circuit 300 and the ECU 100.

—Shift Operation Apparatus—

On the other hand, a shift operation apparatus 5 as shown in FIG. 5 is disposed near a driver's seat of the vehicle. A shift lever 51 is provided in the shift operation apparatus 5 so as to be displaceable.

In the shift operation apparatus 5 in this example, a P (parking) position, an R (reverse) position, an N (neutral) position, and a D (drive) position are set, and the driver can displace the shift lever 51 to a desired position. A shift position sensor 206 (see FIG. 6) performs detection at the respective positions of the P position, the R position, the N position, and the D position (including both an upshift (+) position and a downshift (−) position of an S position described below). An output signal of the shift position sensor 206 is input to the ECU 100.

The P position and the N position are non-travel positions selected when not causing the vehicle to travel, and the R position and the D position are travel positions selected when causing the vehicle to travel.

When the P position is selected with the shift lever 51, as shown in FIG. 4, the clutches C1 to C4, the brakes B1 to B4, and the one-way clutches F0 to F3 of the automatic transmission 3 are all released, and the output shaft 34 is locked by a parking mechanism (not shown). When the N position is selected, the clutches C1 to C4, the brakes B1 to B4, and the one-way clutches F0 to F3 of the automatic transmission 3 are all released.

When the D position is selected, the automatic gearshift mode, in which the automatic transmission 3 is automatically gearshifted according to the vehicle operating state or the like, is set, and gearshift control of the plurality of forward gears (six forward gears) of the automatic transmission 3 is performed automatically. When the R position is selected, the automatic transmission 3 is switched to the reverse gear.

Also, as shown in FIG. 5B, an S (sequential) position 52 is provided in the shift operation apparatus 5, and when the shift lever 51 has been operated to the S position 52, the manual gearshift mode (sequential mode), in which gearshift operations are performed by hand, is set. When the shift lever 51 is operated to upshift (+) or downshift (−) in the manual gearshift mode, the forward gear of the automatic transmission 3 is increased or decreased. Specifically, each time that the shift lever 51 is operated to upshift (+), the gear is increased by one (e.g., 1st→2nd→ . . . →6th). On the other hand, each time that the shift lever 51 is operated to downshift (−), the gear is decreased by one (e.g., 6th→5th→ . . . →1st).

—ECU—

Figure 6:
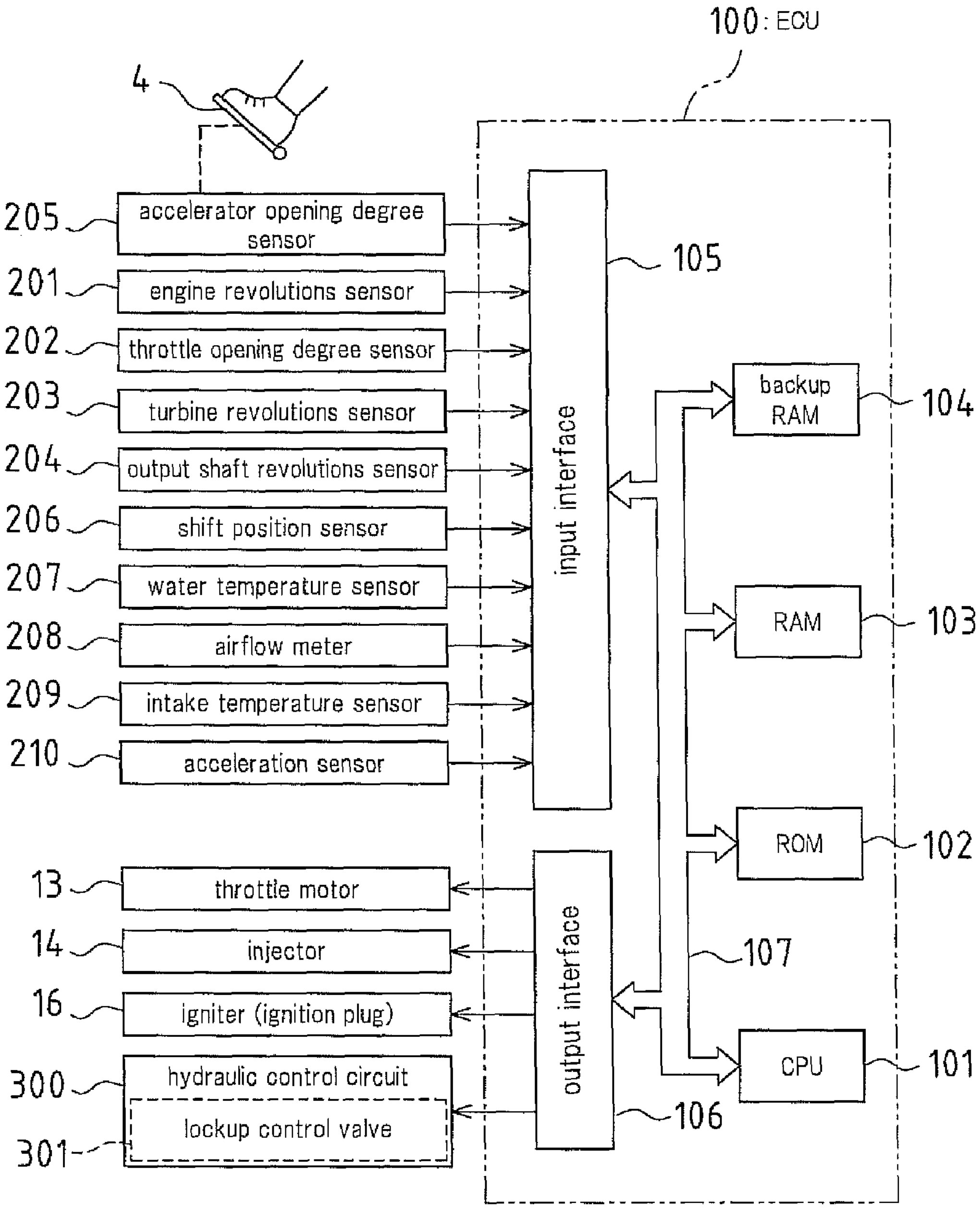

The ECU 100, as shown in FIG. 6, is provided with a CPU 101, a ROM 102, a RAM 103, a backup RAM 104, and so forth.

Various programs or the like are stored in the ROM 102, including programs for executing control related to basic driving of the vehicle, and also programs for executing gearshift control that sets the gear of the automatic transmission 3 according to the vehicle running state. The specific content of this gearshift control will be described later.

The CPU 101 executes various computational processing based on the various control programs and maps stored in the ROM 102. The RAM 103 is a memory that temporarily stores the results of computational processing with the CPU 101, data that has been input from sensors, and so forth. The backup RAM 104 is a nonvolatile memory that stores data or the like to be saved when stopping the engine 1.

The CPU 101, the ROM 102, the RAM 103, and the backup RAM 104 are connected to each other via a bus 107, and are connected to an input interface 105 and an output interface 106.

The engine revolutions sensor 201, the throttle opening degree sensor 202, the turbine revolutions sensor 203, the output shaft revolutions sensor 204, an accelerator opening degree sensor 205 that detects the opening degree of an accelerator pedal 4, the shift position sensor 206, the water temperature sensor 207, the airflow meter 208, the intake temperature sensor 209, an acceleration sensor 210 that detects acceleration in the front-rear direction and the left-right direction of the vehicle, and so forth are connected to the input interface 105, and signals from each of these sensors are input into the ECU 100.

The throttle motor 13 of the throttle valve 12, the injector 14, the igniter 16 of the ignition plug 15, the hydraulic control circuit 300, and so forth are connected to the output interface 106.

The ECU 100, based on the output signals of the various sensors above, executes various control of the engine 1, including control of the opening degree of the throttle valve 12 of the engine 1, control of ignition timing (control of driving of the igniter 16), control of the fuel injection amount (control of opening/closing of the injector 14), and so forth.

Also, the ECU 100 outputs a solenoid control signal (hydraulic command signal) that sets the gear of the automatic transmission 3 to the hydraulic control circuit 300. Based on this solenoid control signal, excitation/non-excitation or the like of a linear solenoid valve or on-off solenoid valve of the hydraulic control circuit 300 is controlled to engage or release the clutches C1 to C4, the brakes B1 to B4, the one-way clutches F0 to F3, and so forth of the automatic transmission 3 in a predetermined state, so as to configure a predetermined gear (1st to 6th gear).

Furthermore, the ECU 100 outputs a lockup clutch control signal (hydraulic command signal) to the hydraulic control circuit 300. Based on this lockup clutch control signal, a lockup control valve 301 or the like of the hydraulic control circuit 300 is controlled so that the lockup clutch 25 of the torque converter 2 is engaged, half-engaged, or released.

Following is a description of gearshift control, lockup control, deceleration lockup slippage control, and downshift control during deceleration (hereinafter also referred to as coast-down gearshift control) that are executed by the ECU 100.

—Gearshift Control—

First, a gearshift map used in the gearshift control of this example will be described with reference to FIG. 7.

Figure 7:
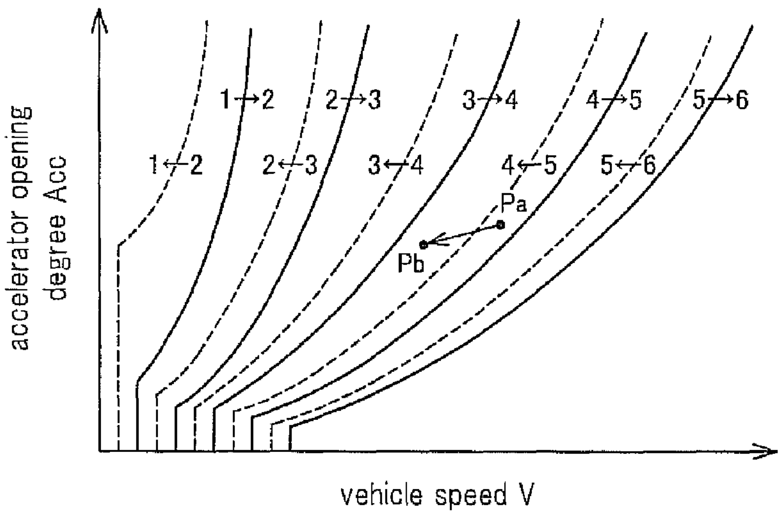
FIG. 7 shows an example of a map used for gearshift control.

The gearshift map shown in FIG. 7 is a map in which are set a plurality of regions for, using a vehicle speed V and an accelerator opening degree Acc as parameters, calculating an appropriate gear (gear in which optimal fuel consumption is obtained) according to the vehicle speed V and the accelerator opening degree Acc. This gearshift map is stored in the ROM 102 of the ECU 100. The regions of the gearshift map are demarcated by a plurality of gearshift lines (gear switching lines).

In the gearshift map shown in FIG. 7, upshift gearshift lines are indicated by solid lines, and downshift gearshift lines are indicated by broken lines. Also, the respective switching directions of upshifts and downshifts are indicated using numerals and arrows in FIG. 7.

Next is a description of basic operation of the gearshift control.

The ECU 100 calculates a vehicle speed V based on an output signal of the output shaft revolutions sensor 204, calculates an accelerator opening degree Acc from an output signal of the accelerator opening degree sensor 205, refers to the gearshift map in FIG. 7 to calculate a target gear based on the vehicle speed V and the accelerator opening degree Acc, and determines whether or not a gearshift operation is necessary by comparing that target gear to the current gear.

Based on the result of that determination, when a gearshift is not necessary (when the target gear and the current gear are the same, so the gear is appropriately set), a solenoid control signal (hydraulic command signal) that maintains the current gear is output to the hydraulic control circuit 300.

On the other hand, when the target gear and the current gear are different, gearshift control is performed. For example, in a case where the vehicle running state has changed from a circumstance in which the vehicle is running with the gear of the automatic transmission 3 in "5th", i.e., there has been a change from point Pa to point Pb shown in FIG. 7 for example, because this change crosses over a downshift gearshift line [4←5], the target gear calculated from the gearshift map is "4th", so a solenoid control signal (hydraulic command signal) that sets 4th gear is output to the hydraulic control circuit 300, and a gearshift from 5th gear to 4th gear (5th→4th downshift gearshift) is performed.

—Lockup Clutch Control—

A map used for control of the lockup clutch 25 in this example will be described with reference to FIG. 8.

Figure 8:
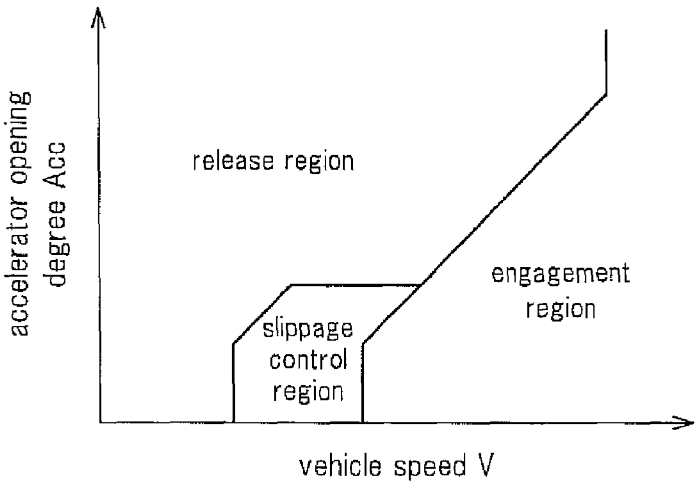
FIG. 8 shows an example of a map used to control a lockup clutch.

The lockup control map shown in FIG. 8 is a map in which the vehicle speed V and the accelerator opening degree Acc are used as parameters, and an engagement region (complete engagement region), a release region (torque converter operating region) and a slippage control region of the lockup clutch 25 are set according to the vehicle speed V and the accelerator opening degree Acc. This lockup control map is stored in the ROM 102 of the ECU 100.

The ECU 100 determines to which of the engagement region, the release region and the slippage control region the vehicle state belongs by referring to the map in FIG. 8 based on the vehicle speed V and the accelerator opening degree Acc obtained from the output signal of each of the output shaft revolutions sensor 204 and the accelerator opening degree sensor 205. When the determined region is the engagement region or the release region, the ECU 100 controls the lockup control valve 301 so as to either engage (lockup on) or release (lockup off) the lockup clutch 25.

When the vehicle state (the vehicle speed V and the accelerator opening degree Acc) is in the slippage control region, the ECU 100 controls the lockup control valve 301, by using the engine revolutions NE and the turbine revolutions NT that are obtained from respective output signals of the engine revolutions sensor 201 and the turbine revolutions sensor 203, such that the difference between the engine revolutions NE and the turbine revolutions NT, or in other words, a slippage amount nslp (nslp=NE−NT) becomes a target revolution difference (target slippage amount), so as to control the slippage amount of the lockup clutch 25 (slippage control).

It is also possible to employ a configuration in which the state of the lockup clutch 25 is switched using a lockup control map according to, instead of the accelerator opening degree Acc, a throttle opening degree (a map for controlling the lockup clutch 25 according to vehicle speed and throttle opening degree).

—Fuel-Cut Control—

The ECU 100 executes fuel cut control when a predetermined condition has been established. Fuel cut control is to stop a fuel supply to the engine 1 in order to improve fuel consumption. With fuel cut control, fuel injection into the engine 1 is stopped (fuel injection from the injector 14 is stopped) during deceleration of the vehicle (acceleration off) and when the engine revolutions NE are not less than the fuel cut start revolutions, and fuel injection into the engine is resumed when the engine revolutions NE decrease below the fuel cut reset revolutions (the revolutions at which fuel cut is stopped to restart fuel injection). With the fuel cut reset revolutions, stall resistance (resistance against engine stalling) can be secured, and the fuel cut reset revolutions are set to revolutions at which it is possible to maintain stable rotation of the engine 1. Likewise, the fuel cut start revolutions are set to revolutions higher than the fuel cut reset revolutions by a predetermined amount. It is appreciated that one skilled in the art would consider these teachings provide a fuel cut control means.

—Deceleration Lockup Slippage Control—

The ECU 100 executes slippage control (deceleration lockup slippage control) of the lockup clutch 25 during execution of fuel cut during deceleration of the vehicle (during coasting). Specifically, the ECU 100 executes slippage control of the lockup clutch 25 at a gear at which the accelerator opening degree Acc obtained from the output signal of the accelerator opening degree sensor 205 is approximately zero ($Acc \approx 0$) and a reverse input torque from the driving wheel side that is generated during forward travel with deceleration is transmitted to the engine 1 side, or in other words, a gear at which an engine brake action can be obtained. With the execution of such slippage control, the turbine revolution speed NT and the engine revolution speed NE decrease moderately according to the rate of deceleration of the vehicle, and the engine revolution speed NE is increased close to the turbine revolution speed NT, as a result of which, the control state (fuel cut state) in which the amount of fuel supply to the engine 1 is suppressed is maintained for an even longer period of time, improving fuel consumption. In addition, it is appreciated that one skilled in the art would consider these teachings provide a downshift control means.

—Coast-Down Gear Shift Control (1)—

Figure 9:
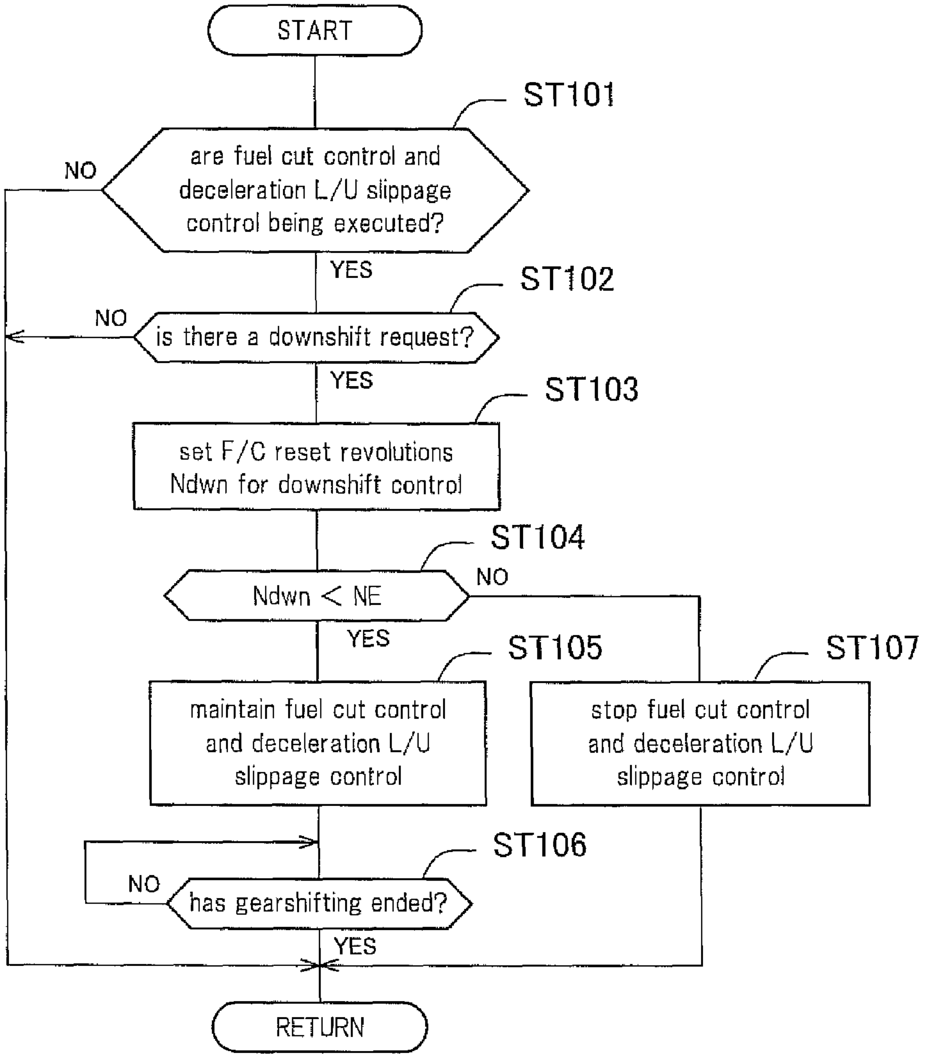
FIG. 9 is a flowchart that shows an example of coast-down gearshift control.
Figure 10:
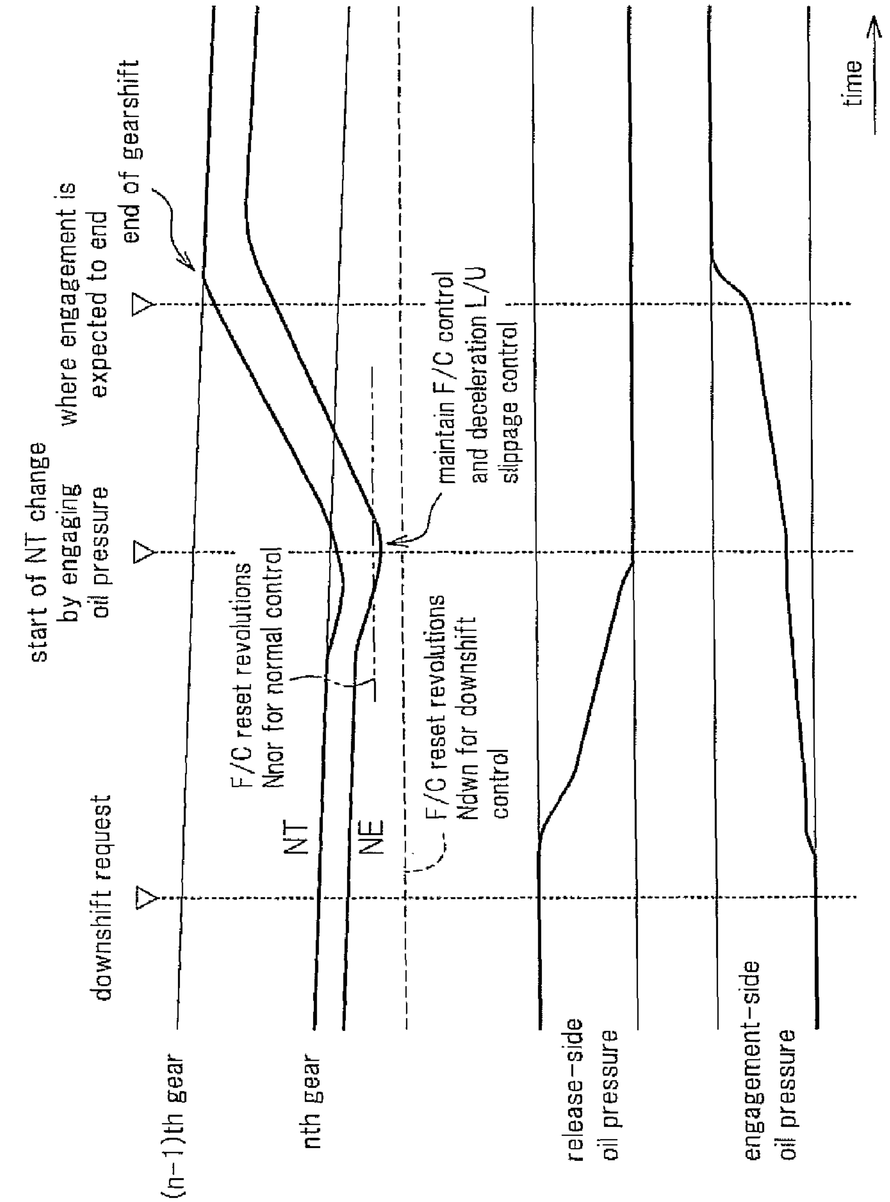
FIG. 10 is a timing chart that shows an example of coast-down gearshift control.

Next, an example of coast-down gearshift control executed by the ECU 100 will be described with reference to the flowchart in FIG. 9 and the timing chart in FIG. 10. The control routine in FIG. 9 is executed repeatedly at each instance of a predetermined period by the ECU 100 and it is appreciated that one skilled in the art would consider these teachings provide a downshift control means.

First, in Step ST101, a determination is made of whether or not fuel cut control as well as deceleration lockup slippage control (deceleration L/U slippage control) are being executed based on the output signal of each of the output shaft revolutions sensor 204, the accelerator opening degree sensor 205 and the turbine revolutions sensor 203, and the like, and when the result of that determination is affirmative, the routine proceeds to Step ST102. When the result of the determination in Step ST101 is negative, the routine returns.

In Step ST102, a determination is made of whether or not a downshift request for the automatic transmission 3 has occurred. Specifically, a determination is made of whether or not there are a vehicle speed V (accelerator opening degree $Acc \approx 0$) obtained from the output signal of the output shaft revolutions sensor 204 and a downshift request based on the gearshift map in FIG. 7 (e.g., 5th→4th downshift request), and when the result of that determination is affirmative (when there is a downshift request), downshift control (coast-down gearshift control) is started, and the routine proceeds to Step ST103. When the result of the determination in Step ST102 is negative (when there is no downshift request), the routine returns, and a determination is made of whether to maintain or stop fuel cut control by using fuel cut reset revolutions Nnor for normal control.

In Step ST103, fuel cut reset revolutions (F/C reset revolutions) Ndwn for downshift control are set. The fuel cut reset revolutions Ndwn for downshift control are lower than the fuel cut reset revolutions (F/C reset revolutions) Nnor for normal control ($Ndwn < Nnor$), as shown in FIG. 10.

Next, in Step ST104, a determination is made of whether or not the present engine revolutions NE obtained from the output signal of the engine revolutions sensor 201 are higher than the fuel cut reset revolutions Ndwn for downshift control set in Step ST103, and when the result of that determination is affirmative ($Ndwn < NE$), the fuel cut control and the deceleration lockup slippage control are maintained (Step ST105). After that, the process ends at the point in time when the gearshift of the automatic transmission 3 is completed (at the point in time when the result of the determination in Step ST106 becomes affirmative), and the routine returns.

On the other hand, when the result of the determination in Step ST104 is negative, or in other words, when the present engine revolutions NE are not higher than the fuel cut reset revolutions Ndwn for downshift control ($NE \leqq Ndwn$), the fuel cut control and the deceleration lockup slippage control are canceled (Step ST107), and fuel injection into the engine 1 is resumed.

As described above, according to the control in this example, the fuel cut reset revolutions are set lower than those (Nnor) for normal control when coast-down gearshift control is performed. As such, even when the engine revolutions NE temporarily drop due to variations in the operating state of the vehicle, variations in the hardware of the vehicle or the like as shown in FIG. 10, as long as the engine revolutions NE do not decrease to the fuel cut reset revolutions Ndwn for downshift control, the fuel cut control (F/C control) and the deceleration lockup slippage control (deceleration L/U slippage control) can be maintained, whereby an improvement in fuel consumption can be achieved. Moreover, it is unnecessary to set a downshift gearshift line (downshift gearshift point) to a higher vehicle speed side, so fuel cut can be maintained while suppressing the occurrence of a gearshift shock.

The fuel cut reset revolutions Ndwn for downshift control used in this example are set to a value adapted according to testing, calculation, and so forth, in consideration of the amount of a temporary drop (see, for example, FIG. 10) in engine revolutions due to variations in the operating state of the vehicle (variations in oil pressure control or the like), variations in the hardware of the vehicle or the like mentioned above, the possibility of engine stalling caused by such a temporary drop in the revolutions, and the like.

Next, other examples (2) to (5) of coast-down gearshift control executed by the ECU 100 will be described.

—Coast-Down Gear Shift Control (2)—

Figure 11:
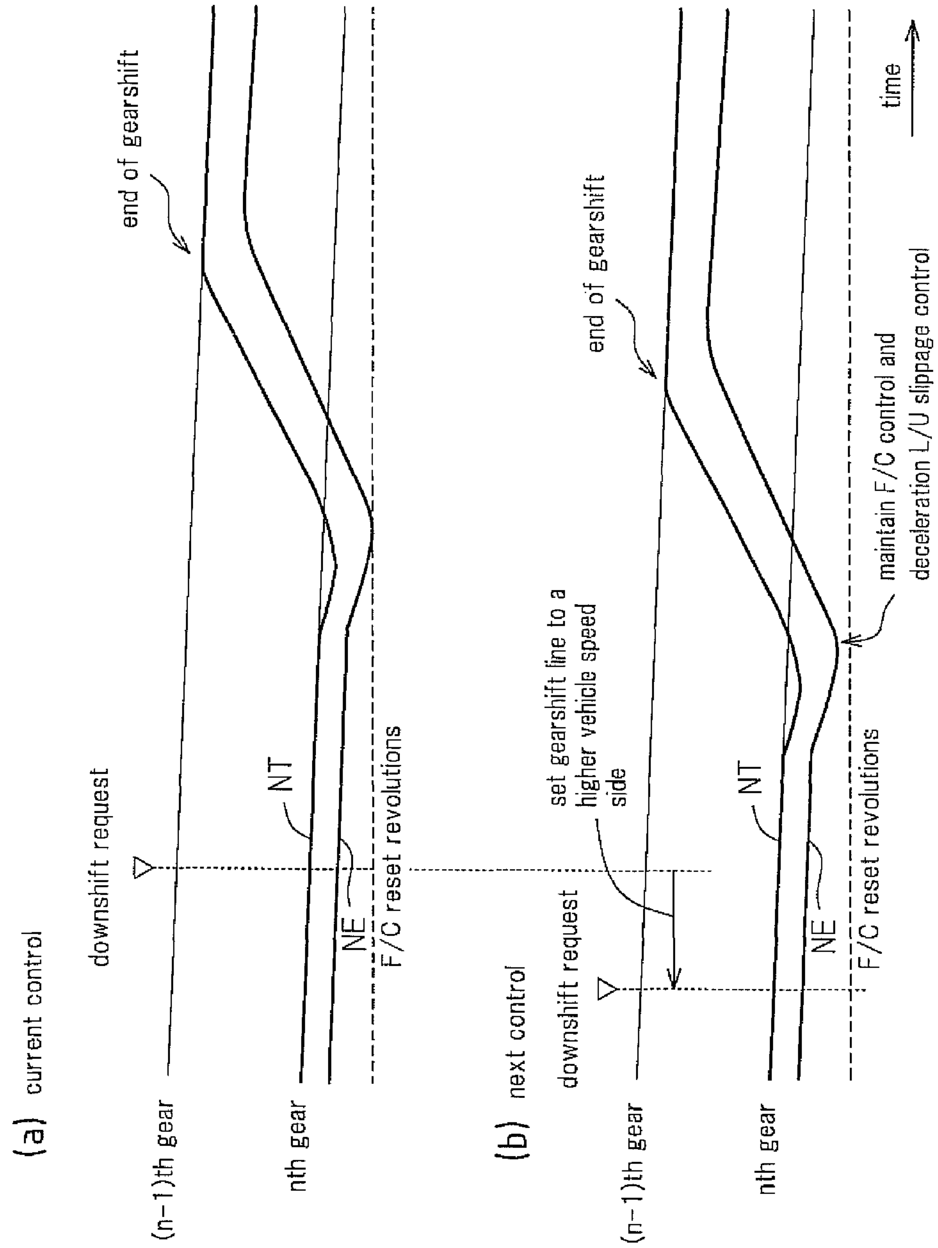
FIG. 11 includes FIGS. 11A and 11B, where

Another example of coast-down gearshift control will be described with reference to the timing chart in FIG. 11.

A feature of this example is that, when the engine revolutions NE have reached the fuel cut reset revolutions during coast-down gearshift control (FIG. 11A), a downshift gearshift point (a downshift gearshift line close to vehicle speed V=0 in the gearshift map in FIG. 7) is set to a higher vehicle speed side to set the downshift gearshift point to a higher vehicle speed side when the next coast-down gearshift control is performed (FIG. 11B), thereby making it possible to maintain fuel cut control (F/C control) and deceleration lockup slippage control (deceleration L/U slippage control) during execution of downshift control. By executing such control, the fuel cut time can be extended, so an improvement in fuel consumption can be achieved.

The amount of shift of the downshift gearshift line (downshift gearshift point) toward a higher vehicle speed side is set, for example, such that the engine revolutions NE will not reach the fuel cut reset revolutions when the next coast-down gearshift control is performed, by calculating the difference between the engine revolutions NE and the fuel cut reset revolutions and taking the difference in revolutions into consideration.

The control in this example is also applicable to the above (Coast-Down Gear Shift Control (1)). Specifically, when the result of the determination in Step ST104 of FIG. 9 is negative, or in other words, when the present engine revolutions NE are not higher than the fuel cut reset revolutions (reset revolutions for downshift control) Ndwn (NE≦Ndwn), a downshift gearshift line (downshift gearshift point) is set to a higher vehicle speed side when the next coast-down gearshift control is performed. By such a setting, it becomes possible to maintain fuel cut control and deceleration lockup slippage control during execution of the next downshift control.

—Coast-Down Gear Shift Control (3)—

Figure 12:
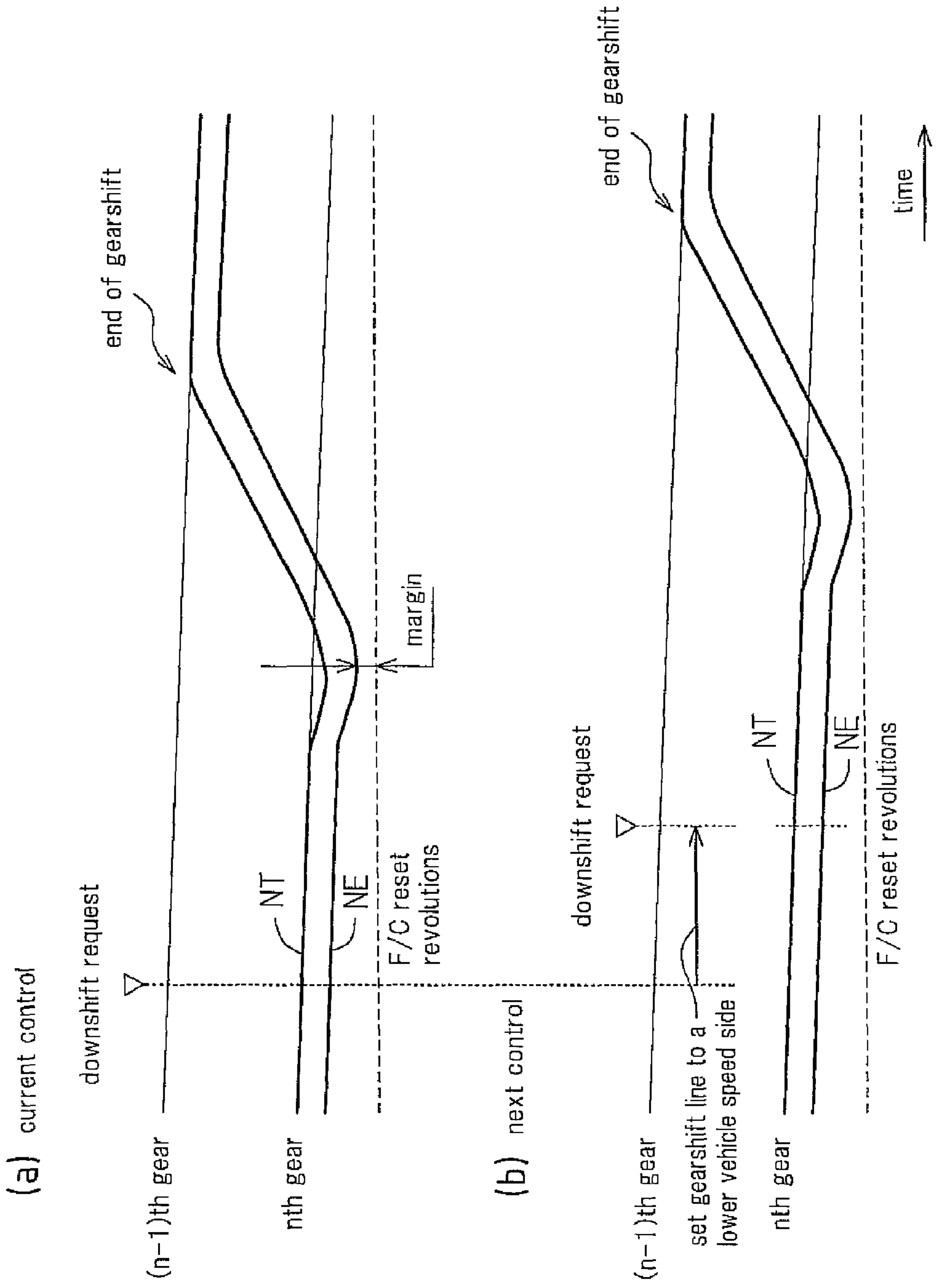
FIG. 12 includes FIGS. 12A and 12B, where

Another example of the coast-down gearshift control will be described with reference to the timing chart in FIG. 12.

In this example, when the engine revolutions NE have a margin (allowance for decrease) with respect to the fuel cut reset revolutions during coast-down gearshift control (FIG. 12A), a downshift gearshift line is set to a lower vehicle speed side when the next coast-down gearshift control is performed. Specifically, a feature of this example is that a downshift gearshift line (a downshift gearshift line close to vehicle speed V=0 in the gearshift map in FIG. 7) is set to as low a vehicle speed side as possible (FIG. 12B) to set the downshift gearshift point to a lower vehicle speed side by taking the above margin (see FIG. 12A) into consideration, whereby the fuel cut can be maintained while suppressing the occurrence of a gearshift shock.

The control in this example is also applicable to the above (Coast-Down Gear Shift Control (1)). Specifically, when the result of the determination in Step ST104 of FIG. 9 is affirmative (that is, the engine revolutions NE are higher than the fuel cut reset revolutions (reset revolutions for downshift control) Ndwn (Ndwn<NE)), and the engine revolutions NE have a margin with respect to the fuel cut reset revolutions Ndwn, a downshift gearshift line (downshift gearshift point) is set to a lower vehicle speed side when the next coast-down gearshift control is performed by calculating the difference between the present engine revolutions NE and the fuel cut reset revolutions Ndwn (margin: see FIG. 12A) and taking that margin into consideration. By such a setting, it is possible to more effectively suppress the occurrence of a gearshift shock during coast-down gearshift control.

—Coast-Down Gear Shift Control (4)—

Figure 13:
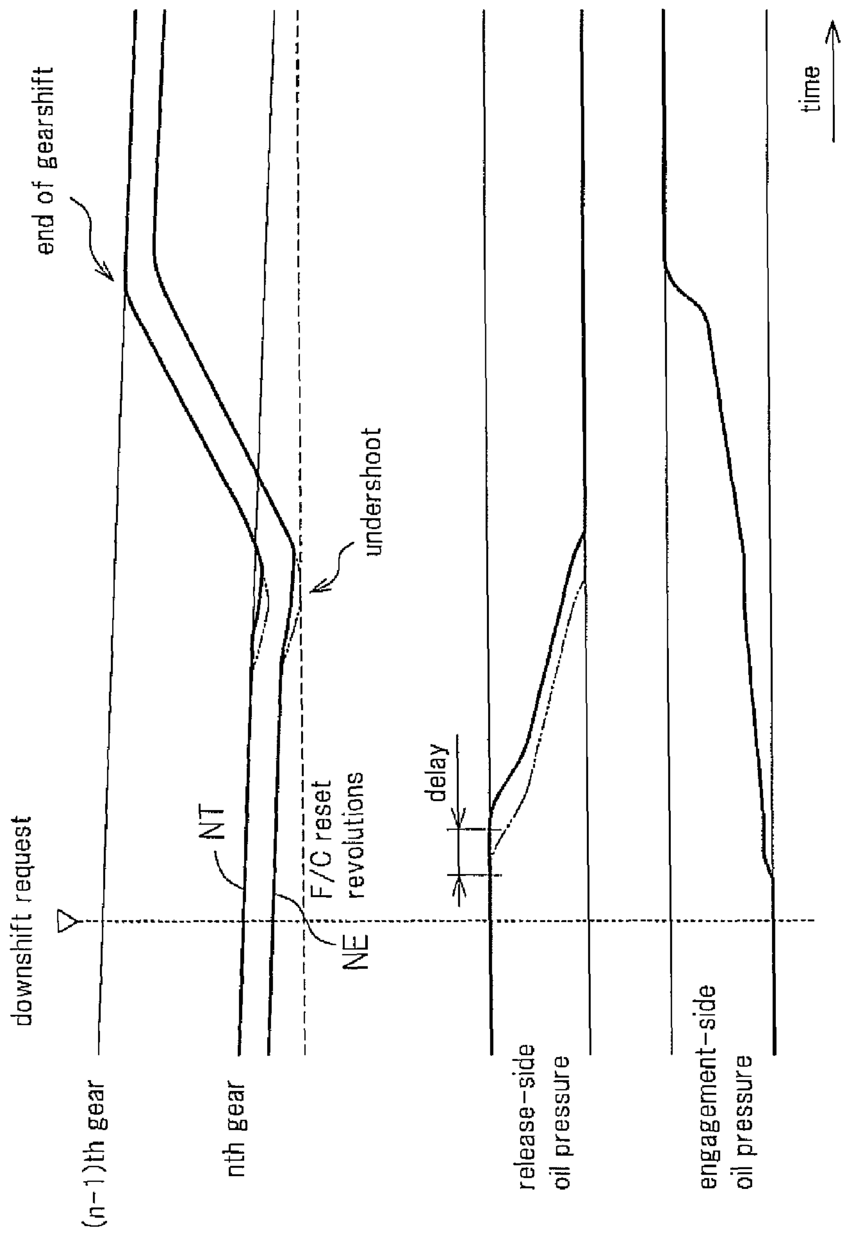
FIG. 13 is a timing chart that shows another example of coast-down gearshift control.

Another example of coast-down gearshift control will be described with reference to the timing chart in FIG. 13.

In this example, when the engine revolutions NE have reached the fuel cut reset revolutions during coast-down gearshift control (indicated by a double-dotted chained line in FIG. 13), the control timing of the release-side oil pressure of a frictionally engaging element (a clutch/brake) of the automatic transmission 3 is delayed with respect to the control timing for normal control (indicated by a double-dotted chained line in FIG. 13) when the next coast-down gearshift control is performed. Such delay control reduces the amount of undershoot of the engine revolutions NE, as a result of which, the engine revolutions NE will not reach the fuel cut reset revolutions, making it possible to maintain fuel cut control and deceleration lockup slippage control. Thus, an improvement in fuel consumption can be achieved.

The control in this example is also applicable to the above (Coast-Down Gear Shift Control (1)). Specifically, when the result of the determination in Step ST104 of FIG. 9 is negative, or in other words, when the present engine revolutions NE are not higher than the fuel cut reset revolutions (reset revolutions for downshift control) Ndwn (NE≦Ndwn), the control timing of the release-side oil pressure of a frictionally engaging element (a clutch/brake) of the automatic transmission 3 is delayed with respect to that for normal control when the next coast-down gearshift control is performed, whereby it becomes possible to maintain fuel cut control and deceleration lockup slippage control during execution of the next downshift control.

—Coast-Down Gear Shift Control (5)—

Figure 14:
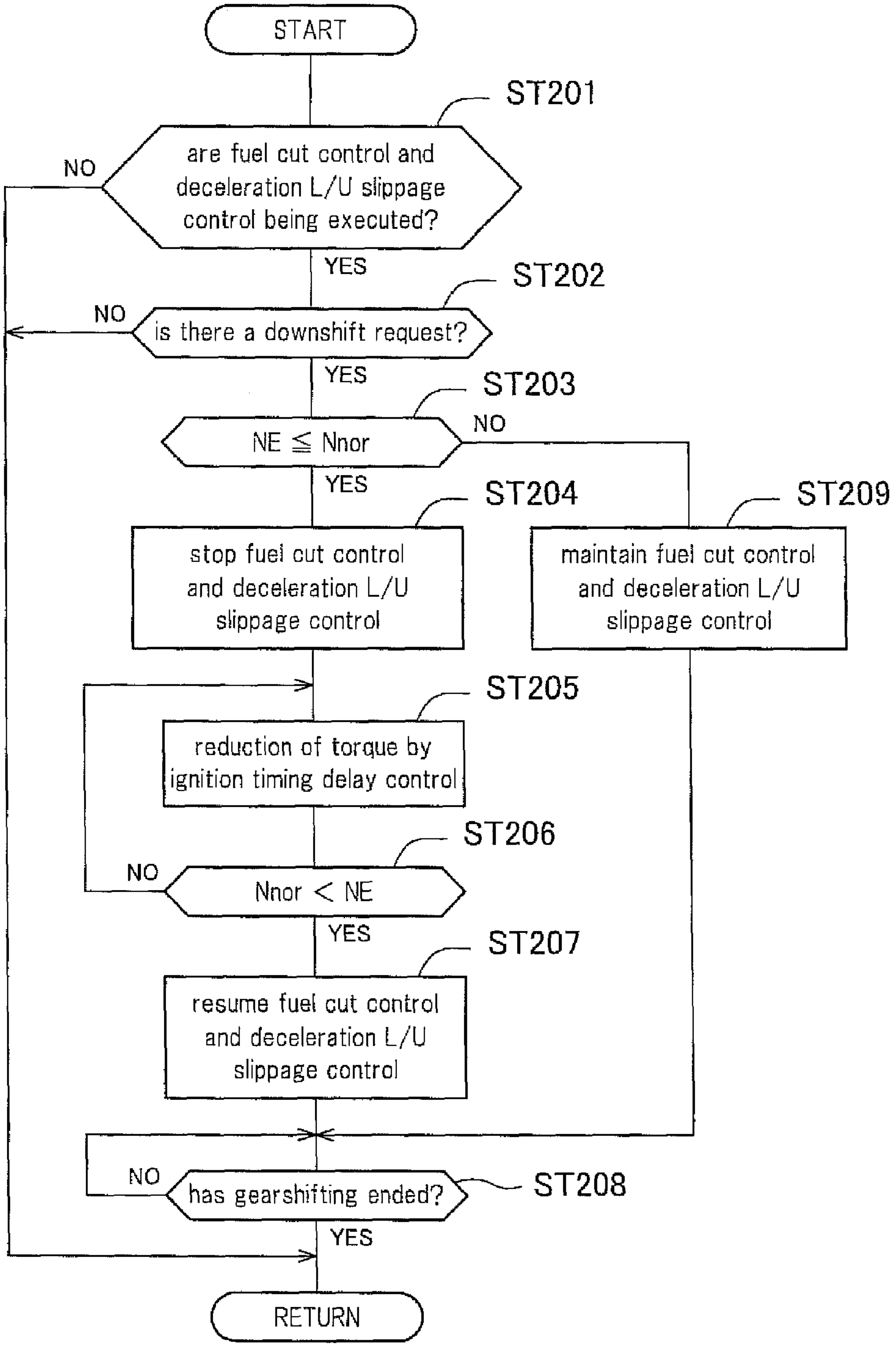
FIG. 14 is a flowchart that shows another example of coast-down gearshift control.
Figure 15:
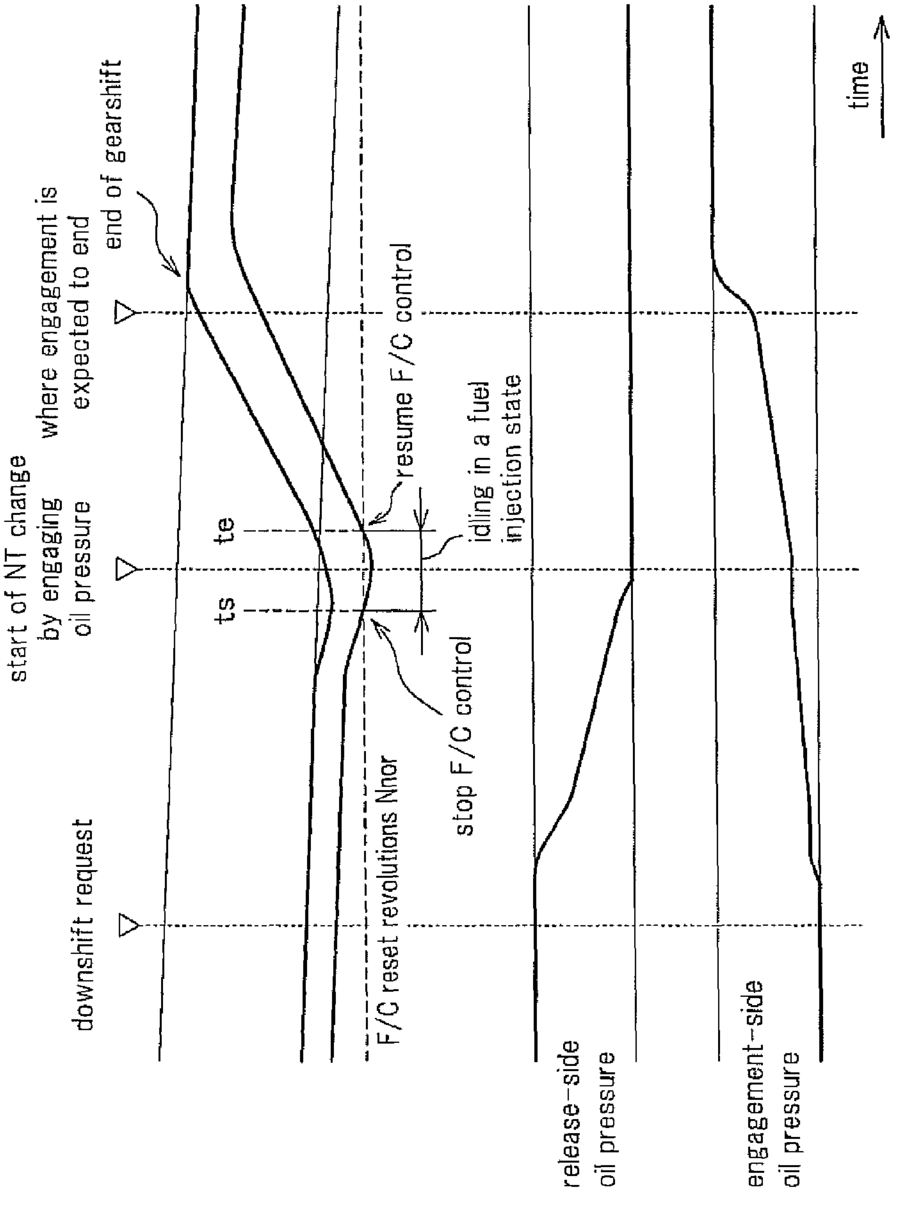
FIG. 15 is a timing chart that shows another example of coast-down gearshift control.

Another example of the coast-down gearshift control will be described with reference to the flowchart in FIG. 14 and the timing chart in FIG. 15. The control routine in FIG. 14 is executed repeatedly at each instance of a predetermined period by the ECU 100.

First, in Step ST201, a determination is made of whether or not fuel cut control as well as deceleration lockup slippage control (deceleration L/U slippage control) are being executed based on the output signal of each of the output shaft revolutions sensor 204, the accelerator opening degree sensor 205 and the turbine revolutions sensor 203, and the like, and when the result of that determination is affirmative, the routine proceeds to Step ST202. When the result of the determination in Step ST201 is negative, the routine returns.

In Step ST202, a determination is made of whether or not a downshift request of the automatic transmission 3 has occurred. Specifically, a determination is made of whether or not there are a vehicle speed V (accelerator opening degree Acc≈0) obtained from the output signal of the output shaft revolutions sensor 204 and a downshift request based on the gearshift map in FIG. 7 (e.g., 5th→4th downshift request), and when the result of that determination is affirmative (when there is a downshift request), downshift control (coast-down gearshift control) is started, and the routine proceeds to Step ST203. When the result of the determination in Step ST202 is negative (when there is no downshift request), the routine returns.

In Step ST203, a determination is made of whether or not the engine revolutions NE obtained from the output signal of the engine revolutions sensor 201 are not higher than the fuel cut reset revolutions (fuel cut reset revolutions for normal control) Nnor, and when the result of that determination is affirmative (NE≦Nnor), the fuel cut control and the deceleration lockup slippage control are interrupted, and fuel injection from the injector 14 is resumed (Step ST204).

Furthermore, when the engine revolutions NE are not higher than the fuel cut reset revolutions Nnor (the time indicated by "ts" in FIG. 15), ignition timing delay control is executed (Step ST205) such that the output torque of the engine 1 becomes the lowest value (specifically, a value that is equal to or close to a fuel cut state), in order for the engine revolutions NE to not exceed the turbine revolutions NT. That is, the engine revolutions NE are held at less than the turbine revolutions NT, by the ignition timing delay control reducing the torque, so as to maintain the driven state of the engine 1 (a state in which deceleration lockup slippage control is possible). When the driven state of the engine 1 is maintained in this manner, as shown in FIG. 15, the engine revolutions NE increase along with a change (increase) in turbine revolutions NT due to an engaging oil pressure.

Next, in Step ST206, a determination is made of whether or not the present engine revolutions NE has become higher than the fuel cut reset revolutions Nnor. At the point in time when the result of the determination becomes affirmative (Nnor<NE) (the time indicated by "te" in FIG. 15), fuel cut control and deceleration lockup slippage control are resumed (Step ST207), and the engine 1 is restored to a normal control state. After that, the process ends at the point in time when the gearshift of the automatic transmission 3 is completed (at the point in time when the result of the determination in Step ST208 becomes affirmative), and the routine returns.

On the other hand, when the result of the determination in Step ST203 is negative, or in other words, when the engine revolutions NE are higher than the fuel cut reset revolutions Nnor (Nnor<NE) during execution of coast-down shift control, the fuel cut control and the deceleration lockup slippage control are maintained (Step ST209), and the process ends at the point in time when the gearshift of the automatic transmission 3 is completed (at the point in time when the result of the determination in Step ST208 becomes affirmative), and the routine returns.

As described above, according to the control in this example, ignition timing delay control is executed when engine revolutions NE are not higher than fuel cut reset revolutions Nnor so as to minimize the torque increase due to fuel injection, so it becomes possible to extend the fuel cut time. This point will be described below.

First, when ignition timing delay control is not executed during the interruption of fuel cut control, the engine revolutions NE soon rise due to fuel injection from the injector 14, and the state of the engine 1 changes from a passive drive state to a drive state at the point in time when the engine revolutions NE overshoot the turbine revolutions NT, as a result of which, deceleration lockup slippage control cannot be performed. For this reason, even when engine revolutions NE reach the fuel cut start revolutions and fuel cut control is resumed while the engine revolutions NE are rising, it is not possible to resume deceleration lockup slippage control, so the fuel cut time cannot be maintained for a long period of time.

In contrast, with control in this example, the ignition timing delay control controls the output torque of the engine 1 so as to be the lowest value (a value that is equal to or close to a fuel cut state) at the point in time when the engine revolutions NE have become not higher than the fuel cut reset revolutions Nnor so as to maintain the driven state of the engine 1 even during fuel injection, as a result of which, it becomes possible to resume deceleration lockup slippage control at the same time as fuel cut control is resumed, so the fuel cut time can be extended. Moreover, because fuel cut control is resumed at the point in time when the engine revolutions NE become not less than the fuel cut reset revolutions Nnor, an idling period in the fuel injection state can be shortened. Thus, an improvement in fuel consumption can be achieved.

Also, because torque is reduced during idling in the fuel injection state by the ignition timing delay control, which is highly responsive, when, for example, the amount a brake pedal is depressed by a driver increases beyond the maximum amount of depression at the start of downshifting, it is possible to instantly shift to normal torque control (cancel the torque reduction control), so stall resistance can be secured.

When the processing in Step ST204 to Step ST208 of FIG. 14 is executed, it is necessary to interrupt the feedback control and learning control of the deceleration lockup slippage control.

In this example, as a means that reduces the torque of the engine 1, any method other than the ignition timing delay can be used. For example, in the case of an engine equipped with a variable valve timing (VVT) mechanism that is capable of changing the opening and closing timings of an intake valve and an exhaust valve, the engine torque may be reduced by changing the VVT control amount.

Other Embodiments

In the above example, the present invention was applied to control of a vehicle equipped with an automatic transmission having six forward gears, but this is not a limitation; the present invention is also applicable to control of a vehicle equipped with a planetary gear automatic transmission having another arbitrary number of gears.

In the above example, the present invention was applied to control of a vehicle equipped with a planetary gear transmission that sets a gear ratio using clutches, brakes, and a planetary gear apparatus, but this is not a limitation; the present invention is also applicable to control of a vehicle equipped with a belt-driven stepless transmission (CVT) having a torque converter with a lockup clutch.

In the above example, the present invention was applied to lockup clutch control of a vehicle equipped with a torque converter as a hydraulic transmission apparatus, but this is not a limitation; the present invention is also applicable to control of a vehicle equipped with a fluid coupling (which has a lockup clutch).

In the above example, the present invention was applied to control of a vehicle equipped with a port fuel injection-type gasoline engine, but this is not a limitation; the present invention is also applicable to control of a vehicle equipped with an in-cylinder direct injection-type gasoline engine. Also, the present invention is not limited to control of a vehicle equipped with a gasoline engine; the present invention is also applicable to control of a vehicle equipped with another engine, such as a diesel engine.

Furthermore, the present invention is not limited to a vehicle having an FR (front engine/rear drive) configuration, and is also applicable to control of a vehicle having an FF (front engine/front drive) configuration, or a four-wheel drive vehicle.

The present invention may be embodied in various other forms without departing from the spirit or essential characteristics thereof. The embodiments disclosed in this application are to be considered in all respects as illustrative and not limiting. The scope of the invention is indicated by the appended claims rather than by the foregoing description, and all modifications or changes that come within the meaning and range of equivalency of the claims are intended to be embraced therein.

What is claimed is:

1. A vehicle control apparatus equipped with an engine and an automatic transmission comprising:

a fuel cut control means that stops fuel injection into the engine on condition that the vehicle is decelerating and engine revolutions are not less than fuel cut reset revolutions, and resumes fuel injection into the engine when the engine revolutions have decreased to the fuel cut reset revolutions; and downshift control means that executes downshifting of the automatic transmission during fuel cut control by the fuel cut control means; and wherein the fuel cut reset revolutions are lowered when executing downshift control during the fuel cut control and when the engine revolutions have decreased to the fuel cut reset revolutions when executing the downshift control during the fuel cut control, a gearshift point for next downshift control during the fuel cut control is changed to a higher vehicle speed side, and the fuel cut control is maintained in the next downshift control during the fuel cut control.

2. The vehicle control apparatus according to claim 1, comprising:

a lockup clutch that directly connects the engine and the automatic transmission; and a deceleration lockup slippage control means that performs slippage control on the lockup clutch during the fuel cut control, wherein the fuel cut reset revolutions are changed to a lower side so as to maintain the fuel cut control and deceleration lockup slippage control when executing the downshift control during the fuel cut control.

3. A vehicle control apparatus equipped with an engine and an automatic transmission comprising:

a fuel cut control means that stops fuel injection into the engine on condition that the vehicle is decelerating and engine revolutions are not less than fuel cut reset revolutions, and resumes fuel injection into the engine when the engine revolutions have decreased to the fuel cut reset revolutions; and downshift control means that executes downshifting of the automatic transmission during fuel cat control by the fuel cut control means, wherein the fuel cut reset revolutions are lowered when executing downshift control during the fuel cut control and when the engine revolutions have a margin with respect to the fuel cut reset revolutions when executing the downshift control during the fuel cut control, a gearshift point for next downshift control during the fuel cut control is changed to a lower vehicle speed side, and the fuel cut control is maintained in the next downshift control during the fuel cut control.

4. The vehicle control apparatus according to claim 3, comprising:

a lockup clutch that directly connects the engine and the automatic transmission; and a deceleration lockup slippage control means that performs slippage control on the lockup clutch during the fuel cut control, wherein the fuel cut reset revolutions are changed to a lower side so as to maintain the fuel cut control and deceleration lockup slippage control when executing the downshift control during the fuel cut control.

5. A vehicle control apparatus equipped with an engine and an automatic transmission comprising:

a fuel cut control means that stops fuel injection into the engine on condition that the vehicle is decelerating and engine revolutions are not less than fuel cut reset revolutions, and resumes fuel injection into the engine when the engine revolutions have decreased to the fuel cut reset revolutions; and a downshift control means that executes downshifting of the automatic transmission during fuel cut control by the fuel cut control means, wherein the fuel cut reset revolutions are lowered when executing downshift control during the fuel cut control and when the engine revolutions have decreased to the fuel cut reset revolutions when executing the downshift control during the fuel cut control, a control timing of a release-side oil pressure of a hydraulic type frictionally engaging apparatus of the automatic transmission is delayed when next downshift control during fuel cut control is performed, and the fuel cut control is maintained in the next downshift control during the fuel cut control.

6. The vehicle control apparatus according to claim 5, comprising:

a lockup clutch that directly connects the engine and the automatic transmission; and a deceleration lockup slippage control means that performs slippage control on the lockup clutch during the fuel cut control, wherein the fuel cut reset revolutions are changed to a lower side so as to maintain the fuel cut control and deceleration lockup slippage control when executing the downshift control during the fuel cut control.

* * * * *

UNITED STATES PATENT AND TRADEMARK OFFICE

CERTIFICATE OF CORRECTION

PATENT NO. : 8,335,621 B2
APPLICATION NO. : 12/624700
DATED : December 18, 2012
INVENTOR(S) : Atsushi Ayabe et al.

It is certified that error appears in the above-identified patent and that said Letters Patent is hereby corrected as shown below:

In the Specification:

At column 17, line number 27, Delete “cat”, Insert --cut--

At column 18, line number 6, Delete “lookup”, Insert --lockup--

Signed and Sealed this
Sixth Day of January, 2015

Michelle K. Lee
*Deputy Director of the United States Patent and Trademark Office*